INVENTOR.
JOSEPH A. BELL
BY Leonard L. Kalish
ATTORNEY

Nov. 13, 1962 J. A. BELL 3,063,652

REEL CONSTRUCTION FOR MOTION PICTURE FILM AND FOR MAGNETIC TAPE AND THE LIKE

Filed July 5, 1956 2 Sheets-Sheet 2

INVENTOR.
JOSEPH A. BELL

BY Leonard L. Kalish

ATTORNEY

United States Patent Office 3,063,652
Patented Nov. 13, 1962

3,063,652
REEL CONSTRUCTION FOR MOTION PICTURE FILM AND FOR MAGNETIC TAPE AND THE LIKE

Joseph A. Bell, 1831 Pastorius St., Philadelphia, Pa.

Filed July 5, 1956, Ser. No. 595,990
1 Claim. (Cl. 242—71.8)

The present invention relates to certain new and useful improvements in reels for motion picture film, sound tape and the like, and it relates more particularly to a reel having either one or both of its side flanges readily attachable and detachable, so as to permit the more ready inserting of the end of the tape into the anchor-slot or the anchor means provided in or associated with the hub of the reel, and to permit generally greater facility in the application of the tape or film or removal thereof from the reel.

In the accompanying drawings in which like reference characters indicate like parts:

The reel embodying the present invention includes a central hub portion designated generally by the numeral 11, and a pair of side flanges 12 and 13, which may be formed with "cut outs" or of radial ribs 28 and a peripheral ring, in the conventional manner.

Figure 1:
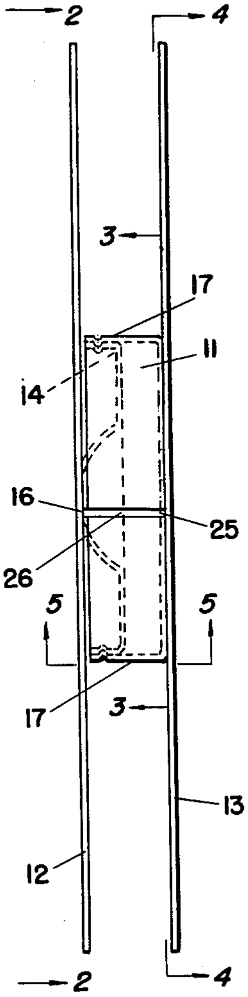
FIGURE 1 is an end elevational view of a reel embodying the present invention.
Figure 2:
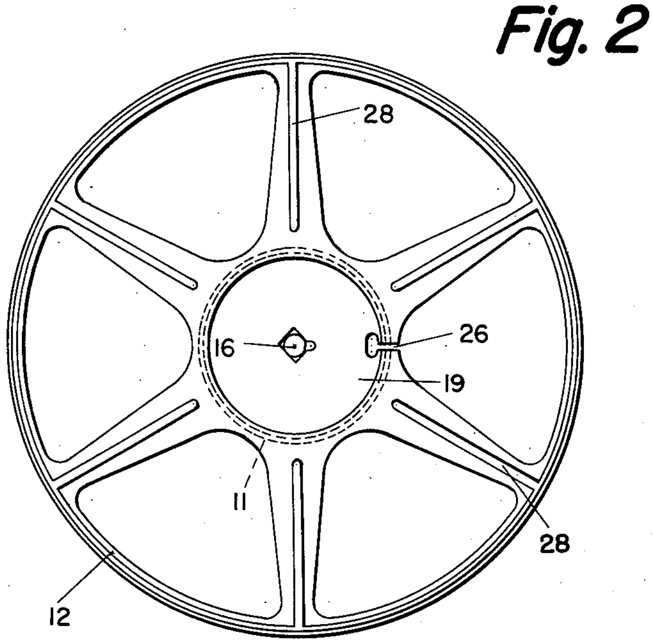
FIGURE 2 represents a side elevational view of the same, viewing the permanently attached flange thereof.
Figure 3:
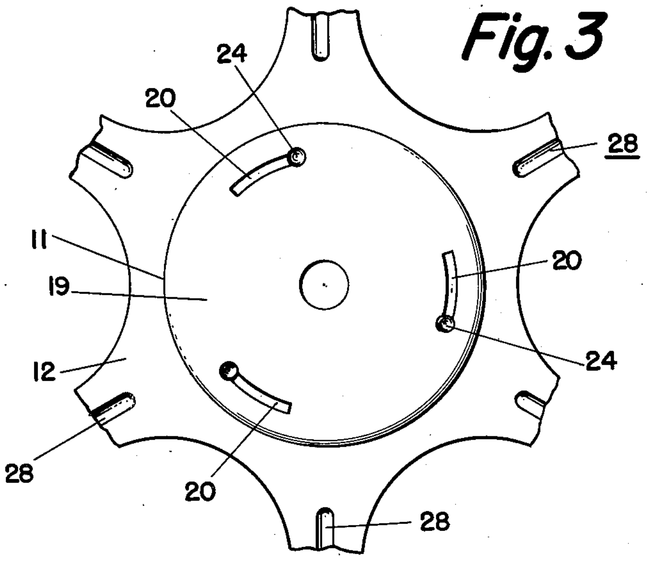
FIGURE 3 represents a section on line 3—3 of FIGURE 1.
Figure 4:
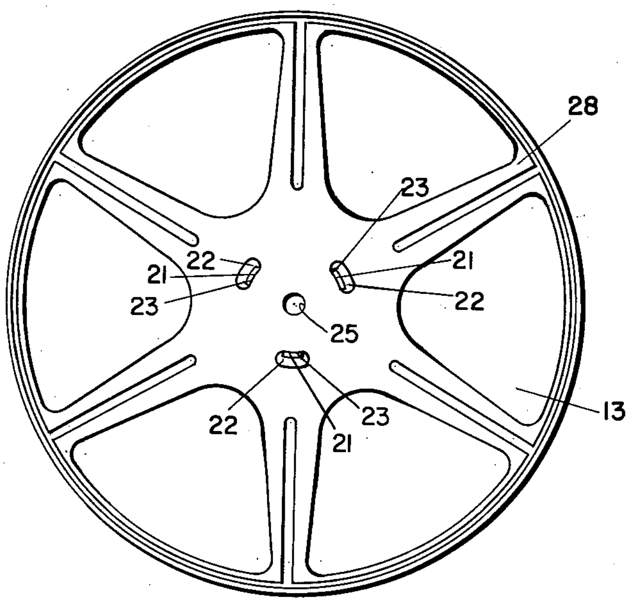
FIGURE 4 represents a section on line 4—4 of FIGURE 1 being, in effect, a side elevational view of the removable side-flange.
Figure 5:
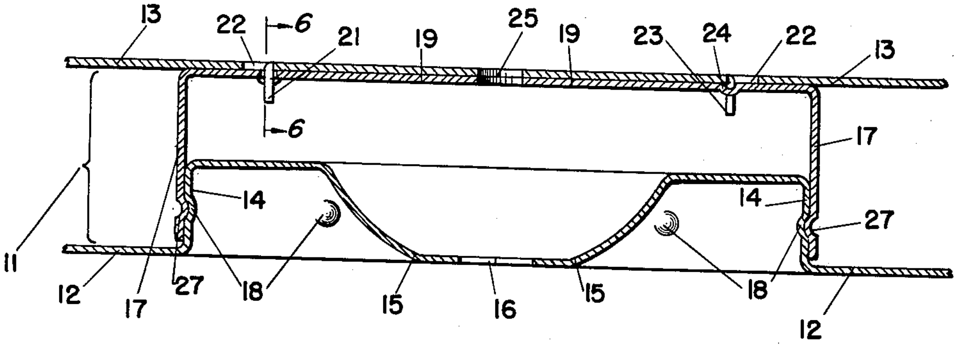
FIGURE 5 represents a cross-sectional view, on an enlarged scale, on line 5—5 of FIGURE 1.

From the central portion of the flange 12, a portion 14 of the hub 11 may be formed by pressing, in the shape indicated in FIGURE 5, and this central portion may then be formed to provide the web 15, more or less in the same plane as the flange 12, in which the spindle-receiving hole 16 is provided.

Another portion of the hub 11 may be formed of an additional sheet metal member having the generally cylindrical portion 17, and the generally transverse wall 19.

Into the transverse wall 19 a plurality of circumferentially distributed arcuate or similar slots 20 are cut, adapted to receive the interlocking hook-like portions 21 formed on the removable side flange 13.

Figure 6:
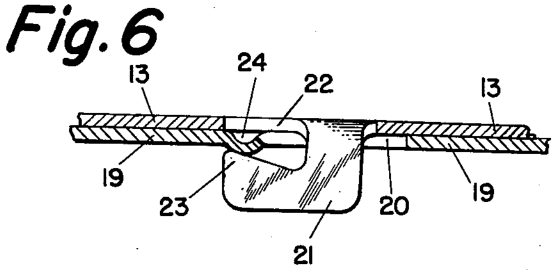
FIGURE 6 represents a partial section on line 6—6 of FIGURE 5, on an enlarged scale.

Each hook-like portion 21 is formed by being cut out of the body of the flange 13 (leaving behind the holes 22), then being bent at a right angle to the plane of the flange, in the manner indicated in FIGURES 5 and 6.

Each hook 21 has a raised terminal portion or finger like portion 23, at or near its end, facing in the direction of the flange 13. Each slot 20 has a downwardly projecting detent 24 at one end thereof.

The relationship of the offsetting of the detent 24 from the plane of the rest of the slots 20, and the offsetting of the tips 23 of the hooks 21, and the thickness of the metal or sheets involved, is such that when the flange 13 is applied to the hub with the hooks 21 inserted into the slots 20, and the flange 13 then rotated in relation to the hub in the direction in which the tips 23 of the hooks 21 will pass the detent 24 at the ends of the slots, the tips 23 will pass such detents with some resistance, and the resiliency of the materials permits such passage. Thus, upon the passage of the tips 23 and the detents 24, in relation to each other, the parts are displaced or deformed slightly, and they then spring back when these parts have passed each other, to create an interlock which will resist the uncoupling of the removable flange from the hub.

The cylindrical hub portion 17 may be affixed to the hub portion 14 at several locations by pinching, using a suitable punching tool to form locking indentations 27 in the hub portion 17 and locking indentation 18 in the hub portion 14. Other conventional methods such as spot welding and riveting may also be used.

The other spindle-receiving opening 25 may either be formed in the wall 19 of the hub portion 17 or it may be formed in the center of the removable flange 13.

A slot 26 is provided in the combined or composite hub 11 at a suitable point in the periphery, for the reception of the end of the film or tape to be anchored to the hub. Other suitable film or tape anchoring means may also be provided on or within or connected with the hub.

Moreover, the hub 11 may be made of a single piece rather than of several parts, so long as the hook-receiving slots or the equivalent thereof, are provided, for the reception of the interlocking hooks carried by the removable flange.

Having described the invention, the following is claimed:

A reel including a hub and a pair of flanking parallel and spaced apart flanges, at least one of said flanges being quickly attachable to and detachable from said hub, a plurality of locking hooks carried by and projecting from the removable flange towards said hub, a plurality of hook-receiving slots in said hub in the same spaced relation to each other as the hooks are to each other, so that the hooks may be brought into registration with said slots, said hooks and said slots being so arranged that when the hooks have been inserted into said slots the turning of said flange in relation to said hub will cause the hooks to interlock with a wall of said hub, said hooks having tips closer to the flange than the portions of the hook immediately in back of the said tips, and the ends of said slots facing said tips when the hooks are inserted into said slots having detents offset towards said hooks when inserted in said slots, the axial spacing between the maximum offset of said detents from the hub being sufficiently greater than the axial spacing between the tips of said hooks and said hub (when the flange bearing said hooks is in operative juxtaposition to said hub, with the hooks thereof inserted into the slots in the hub) so that upon the turning of the hub and the flange in respect to each other in the direction which will bring the hooks into interlocking engagement with the hub, the tips of the hooks will ride up on and over said detents, whereby said tips and said detents provide limited and yieldable resistance to the turning of the flange in relation to the hub when the hooks are inserted in said slot, thereby resisting both the hooking engagement and the unhooking movement of hook in relation to slot.

References Cited in the file of this patent

UNITED STATES PATENTS

| | | |
|---|---|---|
| 913,328 | Uebelmesser | Feb. 23, 1909 |
| 2,132,043 | Oldham | Oct. 4, 1938 |
| 2,563,198 | Thalhammer | Aug. 7, 1951 |
| 2,605,057 | Faulkner et al. | July 29, 1952 |
| 2,679,362 | Thalhammer | May 25, 1954 |